United States Patent [19]

Weatherston

[11] 3,724,534
[45] Apr. 3, 1973

[54] MULTIPLE ZONE CONTROL SYSTEM WITH PRIORITY OF SERVICE

[75] Inventor: Richard N. Weatherston, St. Paul, Minn.

[73] Assignee: Weather-Rite, Inc., St. Paul, Minn.

[22] Filed: Nov. 26, 1971

[21] Appl. No.: 202,176

[52] U.S. Cl. ................165/12, 73/340, 165/22, 165/26, 235/92 MT, 236/1 B, 236/1 C
[51] Int. Cl. ..................................................F24f 3/00
[58] Field of Search........165/12, 22, 26; 235/92 MT, 235/92 ST, 151.3; 236/1 B, 1 C; 73/340

[56] References Cited

UNITED STATES PATENTS

| | | | |
|---|---|---|---|
| 3,247,364 | 4/1966 | El Wazini | 235/151.3 |
| 3,015,954 | 1/1962 | Dalglish | 235/151.3 X |
| 3,618,386 | 11/1971 | Black | 73/340 |
| 3,128,459 | 4/1964 | Harmon | 235/92 ST |
| 3,526,271 | 9/1970 | Jednacz | 165/26 |

Primary Examiner—Manuel A. Antonakas
Attorney—Robert M. Dunning

[57] ABSTRACT

A control system for heating and cooling a plurality of zones in which each zone has a thermostat. The total amount of heating and cooling supplied is controlled by an electronic scanning system which periodically samples each of the zone thermostats and adjusts the overall heating and cooling means according to the sum of the zone requirements. Zones which are assigned a greater importance are attached to more than one input of the scanning system so as to have a greater effect on the scanning system so as to receive priority of service.

5 Claims, 1 Drawing Figure

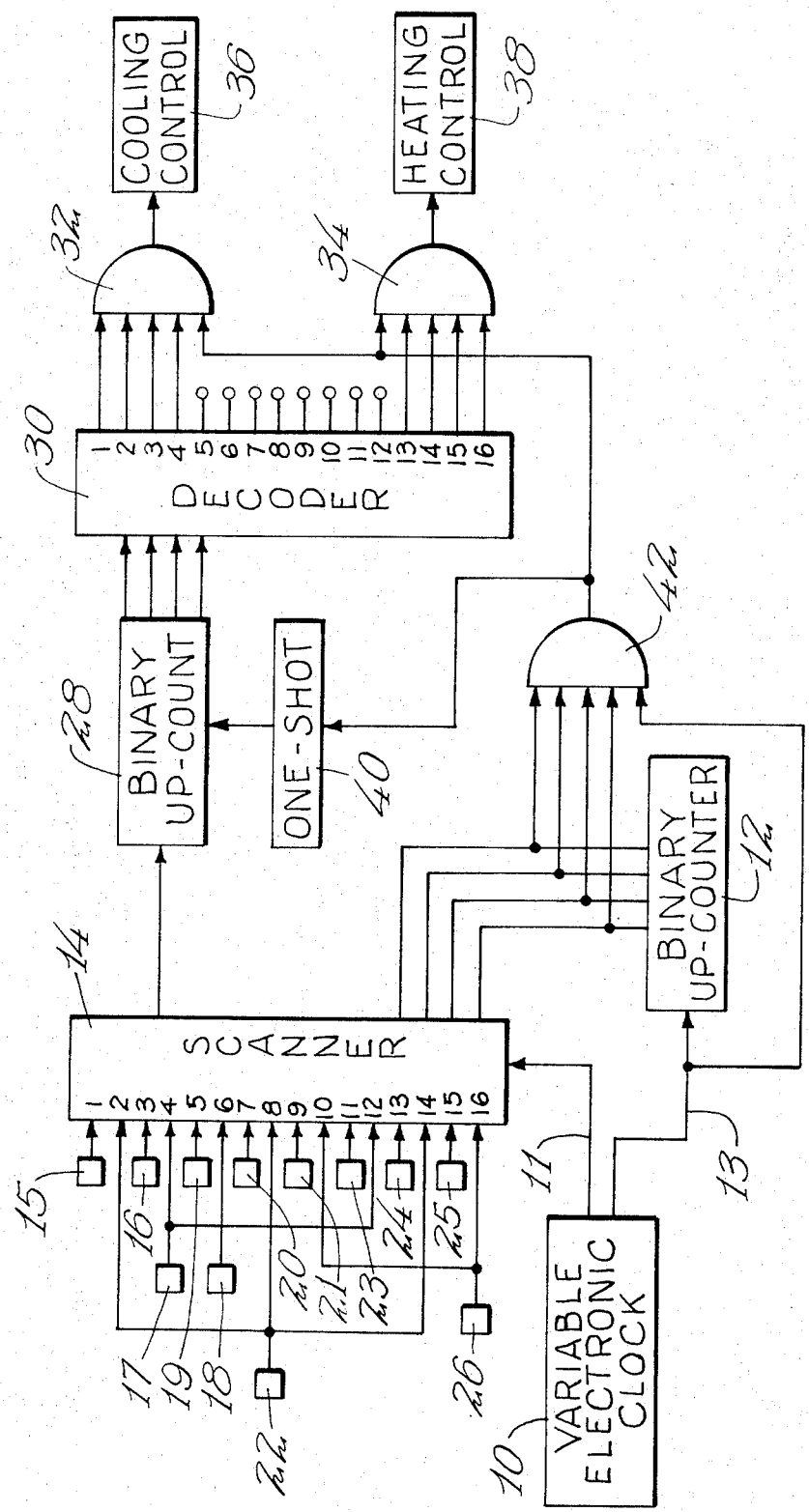

MULTIPLE ZONE CONTROL SYSTEM WITH PRIORITY OF SERVICE

BACKGROUND OF THE INVENTION

In the prior art many control systems have been used for keeping certain controlable factors at a predetermined level. This application is directed in particular to the control of room temperature by heating and cooling the supply of air to the room. A preferred way of accomplishing this end is disclosed in my prior copending patent application Ser. No. 110,526 filed Jan. 28, 1971 for "Staged Heating and Cooling System" and now U.S. Pat. No. 3,677,335. The subject matter of this prior art application relates to a heating and cooling control system in which the changes are incrementally generated by electronic means. This incrementally adjustable control system may be expanded to a multi-zoned system as described in another of my prior copending patent applications Ser. No. 150,545 filed June 7, 1971 entitled "Multiple Zone Heating and Cooling Control System" and now abandoned. The subject matter of the above referenced patent applications provide a significant improvement over the prior art. The subject matter of the instant application concerns an even greater improvement to the above referenced application by providing a system which permits priority of service to zones which are considered to be of more importance than other zones.

SUMMARY OF THE INVENTION

My invention is described herein with respect to a heating and air conditioning system. However, it should be understood that the generalized control system described is applicable to the control of a wide variety of other factors such as water levels, water temperature, pressure, mixture, speed and the like.

Briefly, my invention contemplates controlling heating and cooling to a plurality of zones by means of a local temperature sensing means in each zone. This temperature sensing means may comprise a two position thermostat or a variable voltage output thermostat. Each of the zones is periodically interrogated by an electronic scanning means and information from all of the zones is transmitted to an electronic counter or summing means which periodically determines whether, over a given time period, the net change from all of the zones is toward more cooling or more heating. This result is then transmitted to an electronic control system designed to adjust the master heating and cooling systems in a manner similar to that described in the above referenced earlier filed copending patent application. The electronic scanning means is provided with a plurality of inputs which are sequentially gated open by a timing device, each input being connected to a particular zone. However, for those zones which are considered to be of more importance, such as a large auditorium or the like, more than one of the inputs of the scanning means is connected to that particular zone so that the important zone is interrogated two or more times during each scan, thus, providing priority of service to the particular zone. Thus, it may be seen that it is an object of my invention to provide an improved control system. It is a further object of the present invention to provide a low cost control system capable of working with a multiple number of zones. It is still another object of my invention to provide a multiple zone control system which permits priority of service to certain selected zones. Further objects and advantages will become apparent upon consideration of the following description and drawings.

BRIEF DESCRIPTION OF THE DRAWING

The Drawing shows a schematic circuit diagram of the system of the present invention as applied to an arbitrarily selected twelve zone system wherein two zones are given twice the service of the regular zone and one zone is given three times the service.

DESCRIPTION OF THE PREFERRED EMBODIMENT

Referring to the drawings a schematic circuit for a multiple zone control system is presented. The system shown utilizes a four digit binary code system thus permitting the interrogation of up to sixteen different zones. It will be obvious to those skilled in the art however that the system could be expanded to handle any number of zones desired by simply increasing or decreasing the number of digits available to the binary counting registers. A variable electronic clock 10, which may comprise a pulser circuit whose time between pulses can be varied, drives the entire system. Pulser or clock 10 is connected to alternately supply pulses on line 11 and line 13. As each pulse on line 13 is received by a binary up counter 12, up counter 12 advances one count and presents the total in binary form, to a scanner 14. As the total increases, scanner 14 opens successive electronic gates on input one through sixteen. The alternate pulses on line 11 are also presented to scanner 14 causing scanner 14 to pass through the information from the zones to another binary up counter 28. Scanner 14 may comprise any multiplexer circuit well known to those skilled in the art and in the preferred embodiment is chosen to be a common integrated circuit multiplexer available commercially.

In the embodiment shown the 16 inputs of scanner 14 are connected to 12 different zone thermostats numbered 15 through 26. With each new binary number from up counter 12 scanner 14 advances to the next input in a sequential fashion until all 16 inputs are gated through to binary up counter 28. Since the binary signal for 16 comprises signals on all four of the leads going from up counter 12 to scanner 14 AND gate 42 is connected to all of these leads and also to the clock line 13. Thus as the scan is completed AND gate 42 senses this and upon the next pulse on line 13 signals a one shot circuit 40 to clear binary up counter 28 to zero. One shot 40, however, has a small delay in it so that before counter 28 is cleared to total count received from counter 28 and displayed by a decoder 30 is passed through one of a pair of gates 32 or 34 to the cooling and heating controls 36 and 38. Gates 32 and 34 are opened by the signal from AND gate 42. It should be noted that decoder 30 is provided with a dead zone by failing to connect outputs 5 through 12 to gates 32 and 34. Thus, gates 32 and 34 respond only to relatively low counts (outputs one through 4) or relatively high counts (outputs 13 through 16). The operation of this portion of the system is explained in great detail with respect to the above referenced later filed copending patent application and reference should be had thereto for the details of operation.

Zone thermostat 22 is shown connected to inputs 2, 8 and 14 of scanner 14. Thus, during each scan, scanner 14 interrogates each of the zones at least once but interrogates zone 22 three times. Thus the information from zone 22 is given three times the importance of the more conventional zones. Zone thermostat 22 would most likely be located in a particularly large room such as an auditorium or cafeteria. Zones of intermediate importance may be connected to two outputs such as shown for zone 17 and zone 26. These zones are interrogated twice and therefore are not given as much importance as zone 22 but are given more importance than the zones which are interrogated only once during each scan. Thus, if zone 17, 22 or 26 are calling for more heat scanner 14 gates this information to counter 28 which can thus count up possibly two or even three times rather than just once so as to have a greater effect on decoder 30 and move the count toward the heating control activating gate 34.

Another variation of the present system lies in the fact that some or all of the zones may be interrogated a multiplicty of times in each scan so as to compensate for momentary irregularities which generate false signals from the zone. For example, the thermostat for zone 22 may be positioned near a door and temporarily opening that door could cause a false reading on thermostat 22. However, since scanner 14 interrogates zone 22 several times during its scan the later readings from thermostat 22 would cancel out the erroneous earlier readings. Thus a highly flexible multiple zone control system is presented which can be weighted to any desired degree in favor of particular zones and provided with a great deal of flexibility in addition to all of the advantages recited with respect to the above referenced prior copending patent application.

I claim:

1. A multiple zone temperature control system having a priority of service capability comprising:

heating and cooling means connected to supply heating and cooling to a plurality of zones;

a plurality of temperature measuring means, one in each zone, a scanning means having a plurality of inputs connected to said temperature measuring means operable to sequentially pass signals therefrom indicative of whether each temperature measuring means is calling for heating or cooling, the particular temperature measuring means located in priority areas being connected to more than one of said plurality of inputs;

summing means connected to said scanning means operable to produce an output signal indicative of the algebraic sum of the number of inputs connected to temperature measuring means calling for one of the states of heating or cooling; and control means connected to said summing means and said heating and cooling means operable to vary the heating and cooling means in response to the sum from said summing means.

2. The control system of claim 1 in which said scanning means comprises a multiplexing circuit sequentially advanced by electronic clock means.

3. The control system of claim 2 in which said summing means comprises a first binary up counter, and a decoder having a plurality of outputs, a portion of said outputs representing a call for more cooling being connected to said control means and a different portion of said outputs representing a call for more heating being connected to said control means.

4. The control system of claim 3 in which said electronic clock means comprises a second binary up counter connected to a variable period output electronic pulser.

5. The control system of claim 4 including an AND gate connected to all the outputs of said second binary up counter and said pulser operable to trigger a one shot circuit after each full scan of the scanner, said one shot connected to clear the accumulated count on said first binary up counter and read out the outputs from said decoder.

* * * * *